United States Patent [19]

Cohen

[11] 4,256,864

[45] Mar. 17, 1981

[54] POLYMERIZATION REACTORS COATED WITH POLYMER-INHIBITOR COMPLEXES

[75] Inventor: Louis Cohen, Avon Lake, Ohio

[73] Assignee: The B. F. Goodrich Company, Akron, Ohio

[21] Appl. No.: 99,357

[22] Filed: Dec. 3, 1979

Related U.S. Application Data

[63] Continuation-in-part of Ser. No. 66,151, Aug. 13, 1979, which is a continuation of Ser. No. 929,873, Jul. 31, 1978, abandoned.

[51] Int. Cl.$^3$ .......................... C08F 3/30; C08F 1/11; C08F 1/88
[52] U.S. Cl. .................................... 526/62; 422/131; 422/241
[58] Field of Search .................. 427/230; 526/62; 422/131, 241

[56] References Cited

U.S. PATENT DOCUMENTS

| | | | |
|---|---|---|---|
| 3,669,946 | 6/1972 | Koyanaki | 526/62 |
| 4,007,320 | 2/1977 | Petersen | 526/62 |

*Primary Examiner*—Sam Silverberg
*Attorney, Agent, or Firm*—Roy P. Wymbs

[57] ABSTRACT

This invention relates to the reduction of polymer buildup on the inner surfaces of a polymerization reaction vessel by applying a coating to the inner surfaces thereof. An approximate monolayer coating on the inner surfaces of the reactor results from applying thereto an aqueous solution of a hydrophilic polymer-inhibitor complex, for example, such as a complex of polyvinyl alcohol and the disodium salt of bisphenol A. When polymerizing olefinic monomers, such as vinyl halides, vinylidene halides, and vinylidene monomers having at least one terminal $CH_2=C<$ grouping, and mixtures thereof, in the presence of said coating, polymer buildup on the inner surfaces of the reaction vessel is substantially eliminated.

18 Claims, No Drawings

POLYMERIZATION REACTORS COATED WITH POLYMER-INHIBITOR COMPLEXES

This application is a continuation-in-part of prior application Ser. No. 066,151 filed Aug. 13, 1979 which in turn is a continuation of prior application Ser. No. 929,873, filed July 31, 1978, now abandoned.

BACKGROUND OF THE INVENTION

As is well known, in polymerization type reactions, deposits or buildup of polymer occurs on the inner reactor surfaces which not only interferes with heat transfer, but decreases productivity and adversely affects polymer quality. This problem of buildup is particularly bad in the commercial production of polymers and copolymers of vinyl and vinylidene halides, when polymerized alone or with other vinylidene monomers having a terminal $CH_2=CH<$ group, or with polymerizable monoolefinic monomers. For example, in the commercial production of vinyl chloride polymers, the same are usually produced in the form of discrete particles by polymerizing in aqueous suspension systems. When employing such a polymerization system, the vinyl chloride and other comonomers when used, are maintained in the form of small discrete droplets by the use of suspending agents and agitation. When the reaction is complete, the resultant polymer is washed and dried. The reaction is usually conducted under pressure in metal reactors equipped with baffles and high speed agitators. However, these polymerization systems are, in many cases, unstable. As a consequence, polymer buildup forms on the interior surfaces of the polymerization reactor, including the surfaces of the baffles and agitator. Obviously this polymeric buildup must be removed due to the deleterious effect it causes, particularly on polymer quality.

Various methods have heretofore been proposed to reduce the amount and nature of polymer buildup on polymerization reactor surfaces, such as solvent cleaning, various hydraulic and mechanical reactor cleaners, and the like. See, for example, U.S. Pat. Nos. 3,645,452 and 3,741,808 on hydraulic reactor cleaners. In addition, various methods of coating the reactor surfaces prior to polymerization have been proposed. See, for example, U.S. Pat. Nos. 4,024,330; 4,024,301 and 4,081,248. These various methods and apparatus have done a more than acceptable job. However, the art continues to strive to find the ultimate in the prevention of polymer buildup, particularly, from an economic and environmental point of view.

While the various coating solutions heretofore proposed have been more than satisfactory in achieving the desired results, experience on a commercial scale has shown that more dilute coating solutions would be desirable in order to reduce costs and more importantly, to reduce the color of said solutions, since most all of them are colored. Due to this color, there is a tendency, on occasion, for some of the polymer particles being formed during the polymerization reaction in the presence of the coating on the inner surfaces of the polymerizer to become discolored which, of course, is undesirable and to be avoided, if possible. It should be pointed out, however, that the effectiveness of such coating solutions in reducing, and substantially eliminating polymer buildup is not affected by such discoloration problems. However, work continues to find the ultimate in a reactor coating and particularly one which eliminates the potential discoloration problem.

SUMMARY OF THE INVENTION

It has been found that if a polymerization reaction vessel, particularly one having inner surfaces of stainless steel, has been previously coated on said inner surfaces with the proper coating, undesirable polymer buildup on said surfaces can be substantially decreased, and in many cases entirely eliminated, when polymerizing monoolefinic monomers therein. I have now found that when the interior surfaces of a polymerization reactor are coated with an aqueous solution containing, in certain predescribed concentrations, a complex of a readily adsorbable polymer with certain organic molecules selected from the class of water-soluble polymerization inhibitors, polymer buildup on said interior surfaces of the reactor is essentially eliminated. Due to the nature of the coating solution, it can be applied to the inner surfaces of the reactor without opening the same thus providing a closed polymerization system. When polymerizing the monomer(s) in such a coated reaction vessel or reactor, the same is done in an aqueous polymerization medium which is kept in constant contact with said coated surfaces throughout the polymerization reaction.

DETAILED DESCRIPTION

In accordance with the present invention, a film or coating of a hydrophilic polymer-inhibitor complex is applied to the internal surfaces of a polymerization reactor or vessel by merely contacting said surfaces with an aqueous solution of said complex. It is understood that all exposed surfaces in the interior of the reactor, besides the interior walls, such as the baffles, agitator, and the like, are also treated in like manner. After the aqueous solution of the hydrophilic polymer-inhibitor complex has been applied to the surfaces, the coated surfaces are washed with water prior to the introduction of the polymerization medium in order to remove excess coating solution therefrom. This can be done by spraying the surfaces with water, or filling the reactor with water and draining. Surprisingly there is thereby left, in either case, a tightly adhering coating or film on said surfaces which is not affected by the polymerization medium, even when agitated, in the sense of preventing the coating from substantially reducing or eliminating polymer buildup on said surfaces. Heating, or drying, of the coated surfaces is not necessary prior to introduction of the reaction mixture to the reactor.

The prior art (see U.S. Pat. No. 4,007,320, issued Feb. 8, 1977 to Petersen) has taught the process of coating polymerization reactors with insolubilized polymers or polymeric materials in order to prevent or reduce polymer buildup on the internal surfaces thereof. In order to insolubilize the polymer, the same is cross-linked by an organic titanate, that is the polymer is heated in the presence of the titanate. The temperature that is usually employed in the cross-linking operation is from 50° to 100° C. Among the polymers that can be cross-linked with a titanate is polyvinyl alcohol. In the present invention the polymer-inhibitor complex is not cross-linked even though polyvinyl alcohol is employed. In fact, the complex does not cross-link if heated and does not cross-link when the coating of the polymer-inhibitor complex is in contact with the heated reaction medium in the reactor. This is shown in the examples that follow hereinafter.

In making the hydrophilic polymer-inhibitor complexes useful in the practice of the present invention, a water-soluble polyvinyl alcohol (PVA) is employed. The polyvinyl alcohols are produced by hydrolyzing polyvinyl acetate to an amount in the range of about 70% to about 100%. Since most of the commercial PVA's are hydrolyzed polyvinyl acetates of about 88%, it is preferred, for practical purposes, to employ a PVA which is in the range of about 85% to about 90% hydrolyzed polyvinyl acetate. The most preferred PVA is one which is an 88% hydrolyzed polyvinyl acetate. In addition to PVA, other water-soluble hydrophilic polymers may be employed, such as hydroxyl propyl methyl cellulose (Methocel), polyvinyl pyrrolidone, gelatin (calf skin), acrylic or methacrylic acid polymers and copolymers, maleic anhydride copolymers, soluble protein polymers, such as albumins, ammoniated casein, and the like, saponins, acrylamide and hydroxylalkyl acrylamide polymers and copolymers, etc.

A variety of water soluble inhibitors may be employed which are of varying chemical classes. As examples of the polymerization inhibitors there may be named the disodium salt of bisphenol A(BPA), glucose thiosemicarbazone, 2,4-dinitrobenzene sulfonic acid-Na salt, hydroquinone, methyl ether of hydroquinone, Na salt of acetone thiosemicarbazone, basic salts of phenols, such as bishydroxyphenyl thio ether, or acid salts of certain aromatic amines, such as the HCl salt of self-condensed metaphenylenediamine oligomers, etc. Although the sodium salts of several materials have been mentioned, it should be understood that various other salts can be used, primarily to provide water solubility, such as those of potassium, lithium, ammonium, ethanolamine, etc. These salts generally result in higher pH solutions, with the pH ranging up to 12.0. Lower pH solutions, ranging down to a pH of 2.0, are obtained with the use of the HCl salt of aromatic amine inhibitors. Similarly, various other acid salts can be used, such as the sulfates, phosphates, etc. All of the inhibitors used in making the polymer-inhibitor complexes useful in the present invention are water-soluble as contrasted with the substantially water-insoluble inhibitors as shown in U.S. Pat. No. 3,778,423, Dec. 11, 1973 to Reiter.

The complexes of the instant invention are formed when mixed together in the aqueous medium in preparing the coating solutions. For example, the readily adsorbable polymer PVA associates in water thru the mechanism of hydrogen bonding and/or hydrophobic bonding with an approximately equimolar amount of the organic molecules of the polymerization inhibitor, which bonding is based on the ($-CH_2CH-OH-$) repeating unit of the PVA. Equimolar amounts of the material are usually employed, although this may vary depending upon the ingredients forming the complex. It has been found that the hydrophilic polymer may be varied within the range of about 0.01% to about 2.5% by weight with a range of 0.02% to 1.0% by weight being preferred. The inhibitor may be varied within the range of about 0.04% to about 2.5% by weight with a range of 0.10% to 1.0% by weight being preferred. Importantly, the ratio of hydrophilic polymer to inhibitor should be in the range of about 1:1 to about 1:13. In this range the coating solutions are colorless or only slightly colored with no deleterious effects on polymer quality. Likewise the pH of the resultant coating solution will vary depending upon the materials being used to form the complex. The coating solution may be on either the acid or alkaline side. The pH may vary with the range of about 2:0 to 13:0. For example, a coating solution containing PVA and the disodium salt of bisphenol A will have a pH of 10.6.

The coating solutions of the instant invention are made by conventional methods, using heat and agitation where necessary. Usually a temperature in the range of about 0° C. to about 100° C. is satisfactory. Agitation during dissolution is desirable. The concentration of the complex in the coating solution may vary. I have found that a concentration of hydrophilic polymer-inhibitor complex in the range of about 0.05% to about 5.0% by weight is satisfactory in accomplishing the objectives of the present invention and such coating solutions are colorless to only slightly colored, depending upon the materials being complexed. A preferred concentration range is from 0.1% to 1.0% by weight of the hydrophilic polymer-inhibitor complex. Further, the molecular weight of the complex has an effect on the concentration of the complex in the coating solution or the total solids content of said solution. The total solids content of the polymer-inhibitor complex in the coating solutions of the present invention will be in the range of about 0.08% to about 6.0% by weight. However, since the molecular weight of the complex affects the total solids content in the coating solution, the total solids content, in certain instances, could be less than 0.08% or greater than 6.0% by weight.

As previously pointed out, the coating solution is usually applied to the inner surfaces by spraying. However, it is also possible to apply the coating solution by flooding the reactor and then draining, or painting or brushing on, but spraying is the most practical and economical method of application. After applying the coating solution to the inner surfaces of the reactor, the coated surfaces are sprayed with water and the reactor drained prior to charging the reactor with the polymerization mixture or recipe. It should also be pointed out that the present coating works equally well on glass or metal surfaces, such as stainless steel, and the like. Further, the coated surfaces, after spraying or rinsing with water, do not have to be dried before starting the polymerization reaction.

The thickness of the coating on the reactor surfaces may vary, but usually, and preferably, the coating will be a monolayer on the order of about 20 Å to about 150 Å in thickness. This is accomplished by thoroughly rinsing the coating solution, after application, with water. It is to be understood, of course, that multilayer coatings do accomplish the results desired and the invention should not be restricted thereby. This will be recognized by one skilled in the art.

While the exact adhesion mechanism of the coating to the surfaces of the reactor is not known for certain, it is believed to involve some type of electrical force or adsorption between the reactor surfaces and the hydrophilic polymer-inhibitor complex. At any rate, the coating composition of the present invention does substantially eliminate polymer buildup on the reactor surfaces and what little polymer buildup, if any that may occur, is of the sandy type which is of such a nature that it is readily removable from the reactor surfaces without the necessity of manual scraping procedures. The polymer buildup to be avoided is what is referred to as "paper buildup" since this type of buildup is very difficult to remove and usually requires hand scraping or the use of a high pressure jet stream of water or other liquid. In either event, the reactor must be opened in order to clean the same, which, of course, allows the escape of unreacted monomer, such as vinyl chloride, into the atmosphere, which is hazardous.

In accordance with the present invention, multiple polymerizations may be run without opening the reactor between charges. Although multiple charges may be run without recoating the surfaces, it has been found to be expeditious, and preferred, to recoat the internal surfaces of the reactor after each charge to insure uniform and efficient production. As previously pointed out, with the spray nozzles permanently mounted at strategic points on the reactor, it is possible to reach all inner surfaces thereof. When it is decided to recoat the reactor, the reactor is drained, and the inner surfaces of the reactor are flushed with water. The coating solution is sprayed on the surfaces by means of the spray nozzels and the reactor is drained of the excess solution in such a way that the same can be sent to a recovery system, if desired. Then, optionally, the surfaces are sprayed with water and effluent is discarded or recovered, if desired. Thereafter, the reactor is charged with the polymerization medium and ingredients in the usual manner and the polymerization reaction commnenced. It is understood, of course, that one can recoat the reactor as often as desired without opening the same, even after every charge is polymerized.

After the application of the coating composition on the interior surfaces of the reaction vessel, and spraying thereof with water, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated with regard to the suspension polymerization of vinyl chloride, it is to be understood that the apparatus and process may likewise be applied in the dispersion, emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc., vinylidene monomers having at least one terminal $CH_2=C<$ grouping, such as esters of acrylic acid, for example methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene, vinyl naphthalene, diolefins including butadiene, isoprene, chloroprene, and the like; and mixtures of any types of monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal $CH_2=C<$ grouping, copolymerizable therewith in amounts as great as about 80% or more by weight, based on the weight of the monomer mixture, since polymer buildup in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional makeup liquid containing the monomer or monomers in the same proportions as at start-up. Upon the addition of a certain predetermined amount of liquid, the polymerization reaction is terminated, usually by the addition thereto of a shortstopping agent. The necessity for the addition of liquid is due to the shrinkage in volume of the reaction medium produced by the conversion of the monomer or monomers to the polymeric state.

In order to rate the various coatings, as particularly set forth in the specific examples which follow hereinafter, a percentage scale based on freedom from buildup was devised. In other words, if a reactor was rated 100% it was entirely free from buildup. Normally the control, that is, a reactor without an internal coating, would be rated less than 75%. Any rating of 75% or above is good or a definite improvement.

Another means of rating the polymer buildup is by means of a numerical rating scale with respect to paper and sandy buildup. For example, an uncoated reactor, where normal amounts of both types of buildup occur, is given a rating of 1.5. Any rating below 1.0 is good or a definite improvement. In other words, 0.0 rating is perfect, and so on.

In order to further illustrate the present invention, the following specific examples are given. It is to be understood however that this is merely intended in an illustrative and not limitative sense. In the examples all parts and percents are by weight unless otherwise indicated.

EXAMPLE I

In this Example, a PVA/disodium salt of bisphenol A complex was used in the coating solution. An aqueous coating solution was made, with agitation, containing 0.50% of the disodium salt of bisphenol A and 0.10% of PVA (88% hydrolyzed polyvinyl acetate). This gave a ratio of inhibitor to polymer in the coating solution of 5:1. The pH of the coating solution was 10.6. Two 3 liter reactors were cleaned with scouring powder, one of which was uncoated (Control) and the other was coated with the above coating solution. The coating solution was sprayed on the inner surfaces of the reactor and then the coating was rinsed with water. Thereafter, after having purged the reactor with nitrogen and evacuating the same, the following recipe was charged to each reactor:

| | |
|---|---|
| Vinyl chloride | 1000 gms. |

| | |
|---|---|
| Water (demineralized) | 2055 gms. |
| Vinol 540[1] | 0.5 gm |
| SBP[2] | 0.5 cc. |

[1] 88% hydrolyzed polyvinyl acetate [2] disecondary butyl peroxydicarbonate

A full reactor technique was used in the polymerization reactions, sufficient water being added to keep the reactor full. The temperature of the reaction medium was maintained at 57° C. and the reaction medium was agitated. Water was added during the reaction as the mixture shrank because of formation of polymer. Upon the addition of 400 gms of water, the reaction was discontinued. The contents of each reactor were then removed in usual fashion. After removal of the polymer charge from the reactor, the internal surfaces were rinsed with water, then recoated in the case of one reactor and rinsed with water and a second charge made and polymerized. After the second charge was polymerized, a third charge was polymerized using the same procedure as outlined above. Upon completion of the third charge, the internal surfaces of the reactor were classified in accordance with the aforementioned procedure for rating said surfaces. The uncoated control showed significant buildup after the second charge and had a rating of less than 75%. On the other hand, the coated reactor was exceptionally clear of buildup after 3 charges, having a rating of 97.5%, almost perfect. More importantly, the coating solution used in this Example was colorless.

Good results were likewise obtained when employing a more dilute coating solution using the above ingredients. The coating solution contained 0.10% of the disodium salt of bisphenol A and 0.02% PVA and was colorless. After two charges were made, employing the procedure outlined above, the reactor surfaces had a rating of 95%.

The data shows the superior results of a coated reactor, in accordance with the present invention, over the uncoated reactor.

EXAMPLE II

In this Example, the inhibitor used was a 1% solution of glucose thiosemicarbazone. This was mixed in water with 0.20% PVA in sufficient amount to give a ratio in the coating solution of 5/1 of glucose thiosemicarbazone to PVA. Using the procedure of Example I, the internal surfaces of the reactor were coated, rinsed with water, charge with the recipe of Example and polymerized. This sequence was repeated for 2 cycles. After the second cycle, the reactor surfaces were found to have a rating of 95%, thus showing the superiority over the control.

EXAMPLE III

In this Example, several coating solutions were made up as in Example I, using different hydrophilic polymers and inhibitors. Again using the procedures of Example I, the reactors were coated with these coating solutions and polymerizing the recipe of Example I in the coated reactors for multiple charges. The reactors were evaluated after each charge was completed and compared to the Control. The coating compositions and results are tabulated in the following table:

TABLE I

| COATING COMPOSITION | Rating After- | | |
|---|---|---|---|
| | 1st Charge | 2nd Charge | 3rd Charge |
| (1) Control (no coating) | | | 75% |
| (2) 0.60% 2,4 dinitrobenzene sulfonic acid-Na salt 0.10% PVA | 95% | 93% | |
| (3) 0.50% disodium salt of bisphenol A, 0.04% Hydroxypropyl methyl cellulose | 95% | 93% | 88% |
| (4) 1.0% SAPONIN[1], 1.0% Methyl ether of hydroquinone | 95% | 90% | |

[1] [Sapogenin glycosides] a type of glycoside widely distributed in plants, each saponin consists of a sapogenin which constitutes a glucose moiety of the molecule and sugar.

As can be seen from the above Table, the superior results of the coated reactor over the uncoated reactor (control) are evident.

In the examples that follow, tests were run to show that the hydrophilic polymer-inhibitor complexes of the present invention are not cross-linked and do not cross-link under the elevated temperature conditions of the polymerization reaction.

EXAMPLE IV

In this Example a cross-linked polymer coating of the prior art was employed. A coating solution (A) was made up as follows:

| | |
|---|---|
| 2% polyvinyl alcohol in water | 19.4 gms. |
| 20% triethanolamine titanate in water | 0.6 gm. |
| | 20.0 gms. |

A coating or film about 5 microns thick was made by applying 0.2 gram of the above coating on the surface of a 0.5"×2.5" ferroplate test panel. The panel was then dried and heated for 30 minutes at 70° C. in order to cross-link the polyvinyl alcohol. There resulted a visible clear heavy film on the panel. The weight of the coated panel was 4.12022 gms. The panel was then rinsed with water for 3 minutes whereupon the film swelled but was not removed. This gel surface is the principle in the prior art (U.S. Pat. No. 4,007,320) consisting of an insolubilized or cross-linked but water-sensitive gel which remains on the metal (reactor) surface. The gel was removed using a rubber policeman and blotted dry. The gel weighed 0.01986 gram. The panel was dried and found to have returned to its original weight, namely, 4.11548 gms. The film weight was 0.00474 gram indicating a thickness of 5-9 microns. The gel weight indicated that the degree of cross-linking was medium resulting in an equilibrium water pick-up of 319 pph for the cross-linked polyvinyl alcohol.

A second panel was coated in the same manner and the coating was cross-linked for 30 minutes at 70° C. producing an approximate 5 micron thick film. The panel was fastened to the baffle in a 3 liter polymerization reactor and PVC was made therein using the same recipe and procedure described in Example I. Upon completion of the reaction, the panel was removed and examined. While there was reduction in buildup compared to uncoated control panels, the panel had a uniform but almost sand buildup thereon with a rating judged to be about 0.5 paper. As can be seen from the data in Table II, that follows hereinafter, the cross-linked coating was not as good as the complexes of the present invention.

A third panel was coated with a fresh coating solution (A) but instead of drying and curing the coating, as with the previous panel, it was rinsed with water to leave only the adsorbed coating, if any. The panel was fastened in a reactor and a polymerization run as above. When the panel was removed, it showed no improvement over an uncoated control panel having a continuous paper buildup on its surface with a rating of 1.5, the same as the control. This shows that the coating (A) solution will not reduce buildup unless the same is first cross-linked. The coating of the present invention can be thoroughly rinsed to leave an adsorbed monolayer which does resist polymer buildup.

EXAMPLE V

In this Example, runs or experiments were made to show the difference in behavior of the coatings of hydrophilic polymer-inhibitor complexes of the present invention versus the cross-linked polymer coatings of the prior art. The coating (B) solution was made up as follows:

| | |
|---|---|
| 2% Sodium bisphenol A | 10.0 gms. |
| 2% polyvinyl alcohol (88% hydrolyzed polyvinyl acetate | 2.0 gms. |
| | 12.0 gms. |
| (pH adjusted to 10.5) | |

The coating solution used was adjusted to about 2% total solids so as to closely match the concentration of the polyvinyl alcohol/titanate employed in Example IV. A panel weighing 4.04549 grams was coated with 0.20 gram of coating (B) and then subjected to curing at 70° C. for 30 minutes. After curing the panel weighed 4.05332 grams having a film of 5–7 microns of dried complex thereon. On rinsing with water, the visible film dissolved leaving a monolayer on the panel of adsorbed complex which was detectable by a much reduced contact angle with water compared to the original panel. The presence of the adsorbed monolayer and removal of practically all of the coating by rinsing showed that the coating of the present invention did not cross-link.

A second panel was coated with coating (B) diluted to 0.6% total solids, then rinsed with water leaving a monolayer on the panel having a contact angle with water of 40° versus a contact angle of 75° for an uncoated panel. The panel was then evaluated for buildup using the recipe and polymerization procedure of Example I. The coated panel was far superior to the uncoated panel with 95% of its area being perfectly clean. It was given an overall rating of 0.2 versus a rating of 1.5 for the control panel. There was no cross-linking of the polymer and the good results obtained were due to an irreversibly adsorbed surface layer which not only resisted vigorous rinsing, but also, was resistant to the hydrodynamic environment in a stirred PVC suspension polymerization.

EXAMPLE VI

The purpose of this example was to further demonstrate that the water-soluble sodium salt of bisphenol A (BPA) and the polyvinyl alcohol (88% hydrolyzed PVA) adsorb on the reactor surface in the form of a complex which behaves quite differently from the components alone. Separate panels were dipped in (1) 2% solution of polyvinyl alcohol and (2) 2% solution of $Na_2$ salt of BPA and both panels were rinsed with water. Buildup studies were made on these panels, again using the recipe and polymerization procedure of Example I. The panels were found to be very similar to uncoated controls with overall ratings of 1.5 and 1.2 respectively. The polyvinyl alcohol panel (1) showed a contact angle reduction from 75° (untreated panel) to 45° (panel(1)) immediately on adsorption which remained at 45° after rinsing, but it was completely covered with paper buildup when removed from the reactor. There was no sign of adsorption on panel (2) $Na_2$ salt of BPA) from its solution, as evidenced by wettability tests. Buildup on panel (2) showed complete paper coverage over 85% of the surface with about 15%, in a region near the center, being fairly clean thus giving a slightly better rating than the control panel, namely, 1.2 versus 1.5. These results are quite poor contrasted to the good results obtained when using the complex.

For the purposes of comparison, the results obtained in Examples IV, V and VI are tabulated in the following table:

TABLE II

| Run No. | Coating | Paper Buildup Rating | Covered with Paper | Clean |
|---|---|---|---|---|
| 1. | Control-None | 1.5 | 100% | 0% |
| 2. | 5:1 Na BPA/PVA[1] complex-Monolayer | 0.2 (0.0 over 95% surface) | 5% | 95% |
| 3. | Na BPA-Alone | 1.2 | 85% | 15% |
| 4. | PVA-Alone Monolayer | 1.5 | 100% | 0% |
| 5. | PVA/TEA Titanate[2] Rinsed | 1.5 | 100% | 0% |
| 6. | PVA/TEA Titanate Cross-linked 30 min. @70° C. | 0.5 | 40% | 60% |

[1]5/1 ratio of $Na_2$ salt of bis-phenol A and polyvinyl alcohol (88% hydrolyzed polyvinyl acetate)
[2]Polyvinyl alcohol (99% hydrolyzed polyvinyl acetate)-triethanolamine titanate.

It can readily be seen, from the above Table II, that the complexes are superior to the other coatings. Further, the above Examples show that the complexes of the present invention are not cross-linked and do not cross-link during the polymerization reaction.

Coating of the internal surfaces of the polymerization reaction, in accordance with the present invention, substantially reduces, and in many cases, practically eliminates polymer buildup on said surfaces during the polymerization reaction and thus results in increased production over a unit period of time. In those instances where a little polymer buildup does accumulate on the interior surfaces, it is not of the hard, rough, difficult-to-remove type and is easily removed without employing the difficult and tedious scraping methods that heretofore have been employed. In addition, the coating solutions of the present invention are colorless and when, in certain instances where a little color is evident, it is not sufficient to affect the quality of the polymer produced.

Further, the present invention enables one to operate a closed polymerization system, which, in the case of vinyl chloride polymerization, has the advantage of reducing drastically the parts per million of vinyl chloride in the atmosphere of the plant. Such reduction in vinyl chloride in the atmosphere meets the requirements recently promulgated by OSHA (Occupational Safety and Health Administration) and EPA (Environmental Protection Agency). Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for substantially eliminating the buildup of polymer on the internal surfaces of a polymerization reaction vessel which comprises applying to said surfaces an aqueous coating solution containing a non-cross-linking hydrophilic polymer water-soluble inhibitor complex, rinsing and coating with water, and conducting the polymerization of the monomer(s) in constant contact with the coated internal surfaces of said vessel.

2. A process as defined in claim 1 wherein the coating solution contains from about 0.05% to about 5.0% by weight of the complex.

3. A process as defined in claim 1 wherein the hydrophilic polymer is polyvinyl alcohol.

4. A process as defined in claim 1 wherein the hydrophilic polymer is hydroxy propyl methyl cellulose.

5. A process as claimed in claim 1 wherein the inhibitor is disodium salt of bisphenol A.

6. A process as defined in claim 1 wherein the inhibitor is glucose thiosemicarbazone.

7. A process as defined in claim 1 wherein the inhibitor is 2,4-dinitrobenzene sulfonic acid-Na salt.

8. A process as defined in claim 1 wherein the inhibitor is hydroquinone.

9. A process as defined in claim 1 wherein the ratio of hydrophilic polymer to inhibitor is in the range of about 1:1 to about 1:13.

10. A process as defined in claim 1 wherein the hydrophilic polymer in the coating solution is in the range of about 0.01% to about 2.5% by weight.

11. A process as defined in claim 1 wherein the inhibitor in the coating solution is in the range of about 0.04% to about 2.5% by weight.

12. A process as defined in claim 1 wherein the pH of the coating solution is in the range of about 2.0 to about 12.0.

13. A process as defined in claim 2 wherein the hydrophilic polymer is polyvinyl alcohol and the inhibitor is the disodium salt of bisphenol A.

14. A process as defined in claim 2 wherein the hydrophilic polymer is polyvinyl alcohol and the inhibitor is glucose thiosemicarbazone.

15. A polymerization reaction vessel having on all the internal surfaces thereof a coating comprised of a non-cross-linking hydrophilic polymer-inhibitor complex in the ratio of polymer to inhibitor in the range of about 1:1 to about 1:13.

16. A polymerization reaction vessel as defined in claim 15 wherein the hydrophilic polymer is polyvinyl alcohol and the inhibitor is the disodium salt of bisphenol A.

17. A polymerization reaction vessel as defined in claim 15 wherein the hydrophilic polymer is polyvinyl alcohol and the inhibitor is glucose thiosemicarbazone.

18. A polymerization reaction vessel as defined in claim 15 wherein the hydrophilic polymer is hydroxy propyl methyl cellulose and the inhibitor is the disodium salt of bisphenol A.

* * * * *